United States Patent
Tsuzuki et al.

(10) Patent No.: US 7,444,807 B2
(45) Date of Patent: Nov. 4, 2008

(54) TORQUE CONVERTER

(75) Inventors: Yukihisa Tsuzuki, Kariya (JP); Takao Fukunaga, Kawata (JP); Tomohiro Tasaka, Kawanishi (JP)

(73) Assignees: Aisin Seiki Kabushiki Kaisha, Kariya-shi, Aichi-ken (JP); EXEDY Corporation, Neyagawa-shi, Osaka (JP)

( * ) Notice: Subject to any disclaimer, the term of this patent is extended or adjusted under 35 U.S.C. 154(b) by 324 days.

(21) Appl. No.: 11/235,092

(22) Filed: Sep. 27, 2005

(65) Prior Publication Data

US 2006/0064970 A1 Mar. 30, 2006

(30) Foreign Application Priority Data

Sep. 27, 2004 (JP) ............... 2004-279215

(51) Int. Cl.
*F16D 33/20* (2006.01)
(52) U.S. Cl. .......................... 60/367; 60/330
(58) Field of Classification Search ............. 60/330, 60/362, 367
See application file for complete search history.

(56) References Cited

U.S. PATENT DOCUMENTS 2,663,148 A * 12/1953 Jandasek ............. 60/362
4,260,330 A 4/1981 Frötschner et al.
5,794,436 A * 8/1998 Maeda .................. 60/367

FOREIGN PATENT DOCUMENTS

JP 2-278052 A 11/1990

OTHER PUBLICATIONS

Tomoo Ishihara, "Torque Converter", Mar. 30, 1955, pp. 85-86, vol. 5, Edition 7, Report of Institute of Industrial Science, University of Tokyo, Japan (with partial English language translation).
V. J. Jandasek, "The Design Of A Single-Stage Three-Element Torque Converter", Society of Automotive Engineers, Inc., SAE Technical Papers Document, No. 610576, pp. 208-209 and 1-21, New York, New York, U.S.A., Jan. 1961.

* cited by examiner

*Primary Examiner*—F. Daniel Lopez
(74) *Attorney, Agent, or Firm*—Buchanan Ingersoll & Rooney PC

(57) ABSTRACT

A torque converter includes: a impeller having an outer shell, an inner core, and at least one pump blade provided between the outer shell and the inner core; a turbine having at least one turbine blade; and a stator capable of establishing a fluid circulation between the impeller and the turbine. An exit angle of the at least one pump blade is greater than −90 degrees up to −68 degrees at the most, beginning from a first point, at which the at least one pump blade is in contact with the outer shell, to a second point, at which the at least one pump blade is in contact with the inner core.

6 Claims, 4 Drawing Sheets

TORQUE CONVERTER

CROSS REFERENCE TO RELATED APPLICATIONS

This application is based on and claims priority under 35 U.S.C. §119 with respect to Japanese Patent Application 2004-279215, filed on Sep. 27, 2004, the entire content of which is incorporated herein by reference.

FIELD OF THE INVENTION

This invention generally relates to a torque converter provided in a drive train having an automatic transmission.

BACKGROUND

Recent requirements have led to downsizing a torque converter, for example by shortening a diameter of a torque converter, or by shortening an axial thickness thereof. As a result, a narrow space, at which a torque converter is assembled, a narrow space, at which a torque converter is mounted on an automobile, a motorbike, and so on, a narrow space for housing a torque converter, and so on can be effectively assured. Further, as a result, a manufacturing cost of a torque converter can be effectively reduced.

As one of necessary requirements for attaining a downsizing of a torque converter, a torque capacity coefficient C, which is one of characteristics of a torque converter, has to be improved over an entire range of a speed ratio e. The torque capacity coefficient C is determined by the following equation (1):

$$C = Ti/Ni^2 \quad (1), \text{ and}$$

the speed ratio e is determined by the following equation (2):

$$e = No/Ni \quad (2).$$

Herein "Ti" represents an input torque, "Ni" represents an input shaft rotational number, and "No" represents an output shaft rotational number. An improvement in a torque capacity coefficient C can be effectively obtained in favor of elaborate designs of a torque converter, i.e., by achieving an optimal design of a torque converter, in terms of a shape of each blade (pump blade, turbine blade, and stator blade), a design of a torus outer shell, and so on.

Recently, complicated blade shape of a torque converter has been optimized. For example according to JP 1980 (55)-027598 (corresponding to U.S. Pat. No. 4,260,330), JP1990 (02)-278052A, a designing of a blade shape for the purpose of enhancing a torque capacity coefficient C has attained some positive results.

At variance with improvements in performances of a personal computer, however, according to present design technologies, it is still not possible to put forward required characteristics of a torque converter, and further to satisfy design requirements for producing a complicated torque converter blade shape. In the present studies, materials disclosed remain confined to only the two-dimensional analysis of a stator blade.

Therefore, there may on occasions be designing procedures of designers for designing blade shapes, designing procedures which adopt a one-dimensional performance analysis disclosed in "Design of Single-stage, Three-element Torque Converter" (V. J. Jandasek, SAE Technical Papers Document, No. 610576, pp. 208-209), and in "Torque converter" (Tomoo Ishihara, Report of Institute of Industrial Science, University of Tokyo, 30 Mar. 1955, Volume 5, Edition 7: 85-86). According to this one-dimensional performance analysis, an exit angle of a pump blade is designed at, or greater than, −50 degrees as an optimal angle. If the pump blade is designed to be less than this optimal angle, −50 degrees, an assumption on the basis of this one-dimensional performance analysis may not be able to be established. According to this one-dimensional performance analysis, an angle limit of an optimal angle of the pump blade is −68 degrees. Therefore, it has been unrealistic to design an exit angle of the pump blade at, or less than, −68 degrees. This optimal angle of the pump blade is expressed with a minus sign (−) which represents the pump blade being inclined in the same direction as a crankshaft rotational direction.

Moreover, in terms of an object of downsizing a torque converter, while a procedure to improve a torque capacity coefficient is being pursued, there has been a danger that a torque capacity coefficient within a range of a middle speed ratio (speed ratio e=0.3 to 0.7) becomes greater than a torque capacity coefficient within a range of a low speed ratio (speed ratio e=0 to 0.3). When a torque converter with a superior torque capacity coefficient is mounted on a vehicle such as an automobile, this sort of danger on occasions causes reduction in an engine rotational speed at the low speed ratio range, for example when a vehicle is started or accelerated, thereby damaging an accelerating feeling. This unfavorable circumstance occurs, because, if a torque capacity coefficient is designed at a relatively large value within the range of the middle speed ratio, a flow velocity of a working fluid within the middle speed ratio range becomes greater than a fluid velocity in a circulating direction of a working fluid within the low speed ration range.

Meanwhile, recent developments have led to various experiments which relate to developments in a three-dimensional shape measuring apparatus, and improvements in a press molding precision. In details, recently, it is possible to assess a complicated blade structure by way of a three-dimensional analysis, and is possible to optimize a compressing ratio of a torus-shaped outer shell, by which a friction loss, and an impact loss, inside a torque converter can be effectively reduced. Attention of inventors of the present invention is focused on changing parameters of a blade shape, a change which has conventionally been considered to be unrealistic, thereby enabling to improve a torque transmitting efficiency of a torque converter.

The present invention has been made in view of the above circumstances, and provides a torque converter which can be downsized, and which is capable of improve an accelerating feeling within a range of a low speed ratio, i.e., at a time that a vehicle is started.

SUMMARY OF THE INVENTION

According to an aspect of the present invention, a torque converter includes: a impeller having an outer shell, an inner core, and at least one pump blade provided between the outer shell and the inner core; a turbine having at least one turbine blade; and a stator capable of establishing a fluid circulation between the impeller and the turbine. An exit angle of the at least one pump blade is greater than −90 degrees, beginning from a first point, at which the at least one pump blade is in contact with the outer shell, to a second point, at which the at least one pump blade is in contact with the inner core.

It is preferable that the at least one pump blade is divided into twenty one segments, beginning from a fluid entrance portion, at which a fluid flows into the impeller, up to a fluid exit portion, at which the fluid exits to the turbine. The twenty one segments are numbered from No. 1 to No. 21 being sequential from the fluid entrance portion, wherein the segments No.1 to No. 16 are respectively shaped in such a manner that the segments No.1 to No. 16 respectively give some kinetic momentum at least 1% up to 4% out of an entire amount of kinetic momentum of the fluid generated by the impeller, and the segments No. 17 to No. 21 are respectively shaped in such a manner that the segments No. 17 to No. 21 respectively give some kinetic momentum at least 7% up to 15% out of the entire amount of kinetic momentum of the fluid generated by the impeller.

It is further preferable that the exit angle of the at least one pump blade is at least −80 degrees up to −75 degrees at the most, beginning from the first point to the second point.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figure 1:
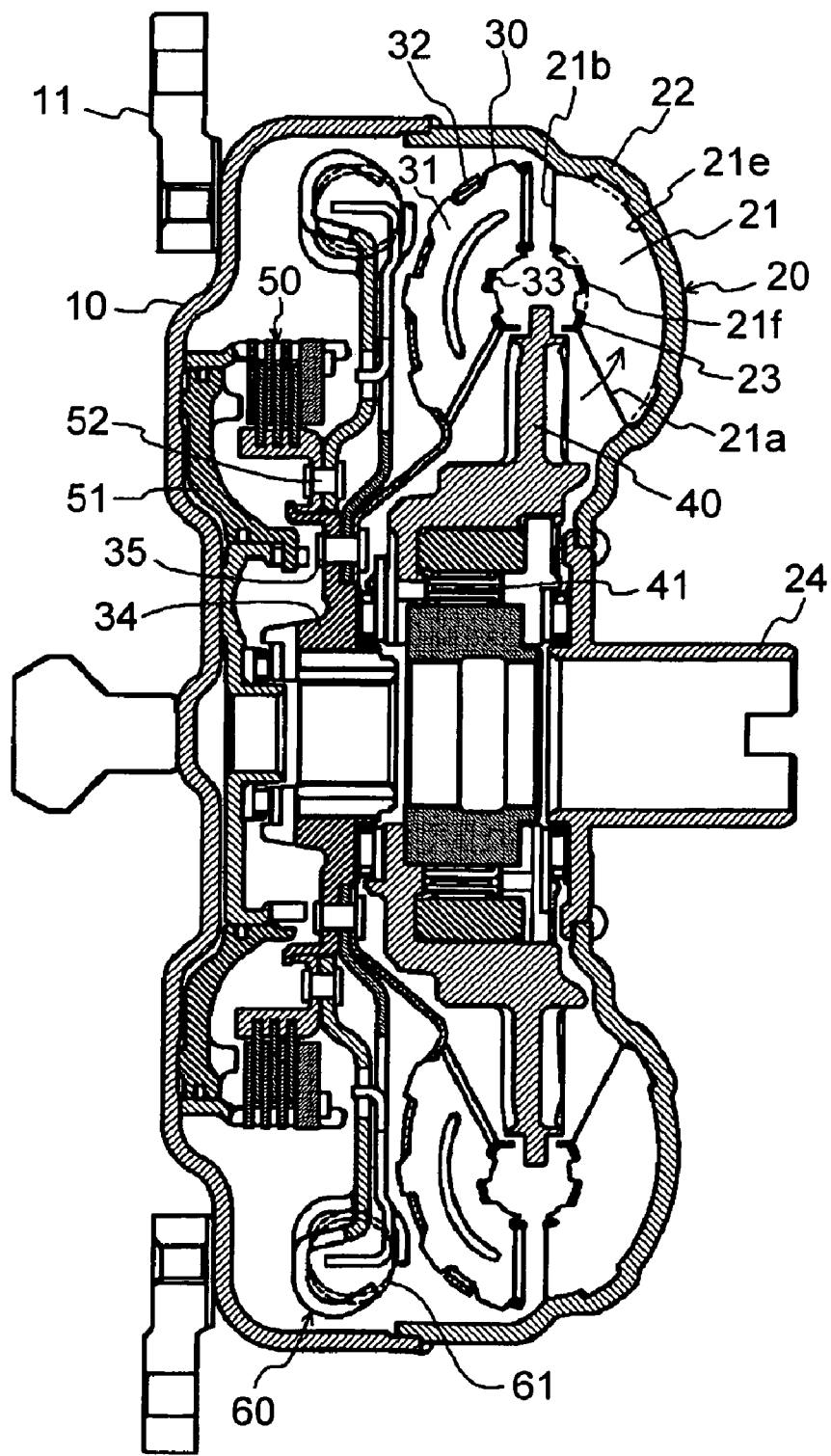
FIG. 1 is a cross sectional view schematically illustrating a structure of a torque converter according to an embodiment of the present invention.

As is illustrated in FIG. 1, a torque converter 1 is employed together with an automatic transmission (not illustrated) for an automobile, as a non-limiting example. The torque converter 1 incorporates, therein, a front cover 10, a pump impeller 20, a turbine runner 30, a stator wheel 40, a lock-up clutch 50 and a damping mechanism 60.

The front cover 10, which is secured to an engine (not illustrated) via a setting block 11, is formed into a bowl-shape, and is securely welded to an outer shell 22 of the pump impeller 20. The engine, which is not illustrated, is positioned at the left side in FIG. 1.

The pump impeller 20 serves as a mechanical element which is capable of transmitting or feeding a fluid, which flows from the stator wheel 40 to the pump impeller 20, to the turbine runner 30, and is provided with plural pump blades 21 (at least one pump blade), the outer shell 22, an inner core 23, and a pump hub 24. The pump blades 21 are implanted between the outer shell 22 and the inner core 23. Detailed description of the pump blades 21 will be given later on. An annular surface of the outer shell 22 (a shell) extends in a radially outward direction which is opposite to the front cover 10, by which the outer shell 22 serves as a shell of the pump impeller 20. An outer circumferential edge of the outer shell 22 is integrally welded to the front cover 10. At an inner circumferential surface of the outer shell 22, the plural pump blades 21 are implanted. The inner core 23 is fixed to the inner edge of each pump blade 21. The pump hub 24 is connected to an inner circumferential edge of the outer shell 22 and is integrally welded thereto. The pump hub 24 is also connected to an oil pump gear (not illustrated). When an engine is activated, a working fluid flows from the stator wheel 40 to the pump impeller 20 as is illustrated with an arrow in FIG. 1 and circulates to the turbine runner 30 from the pump impeller 20.

The turbine runner 30 is a mechanical element which is capable of converting a kinetic energy of a working fluid, which was fed from the pump impeller 20 to the turbine runner 30, to a rotational movement of the turbine runner 30. The turbine runner 30 is arranged to be axially opposed to the pump impeller 20, and is provided with turbine blades 31 (at least one turbine blade), an outer shell 32, an inner core 33 and a turbine hub 34. The plural turbine blades 31 are arranged to be opposed to the plural pump blades 21, and are implanted between the outer shell 32 and the inner core 33. Both end surfaces of each turbine blade 31 is securely in contact with the outer shell 32 and the inner core 33, respectively. An annular surface of the outer shell 32 (a shell) extends in a radially outward direction which is the same side as the front cover 10. At an inner circumference of the outer shell 32, the plural turbine blades 31 are implanted. A radially inner portion of the outer shell 32 is bent and extends axially outwardly (towards the front cover 10), by which the outer shell 32 is connected to the turbine hub 34 by means of rivets 35. The inner core 33 is fixed to the inner edge of each turbine blade 31. The turbine hub 34 possesses a splined inner periphery via which the turbine hub 34 is connected to an input shaft of an automatic transmission. The turbine hub 34 is integrally connected, by means of the rivets 35, to components of the damping mechanism 60 and the outer shell 32.

The stator wheel 40 is a mechanical element which is capable of rectifying an amount, and a speed, of fluid flowing from the turbine runner 30 to the pump impeller 20, and circulating the rectified fluid in the torque converter 1. The stator wheel 40 is positioned between the pump impeller 20 and the turbine runner 30, and is supported by a one-way clutch 41.

The lock-up clutch 50 is a mechanical element which is capable of connecting the pump impeller 20, which constitutes a fluid entrance, and the turbine runner 30, which constitutes a fluid exit, at an event that a difference between a rotational speed of the pump impeller 20 and a rotational speed of the turbine runner 30 is small, by which an engine driving force can be transmitted to an automatic transmission. The lock-up clutch 50 is positioned inside the front cover 10 being coaxially with a torus which is configured with the pump impeller 20 and the turbine runner 30. In response to operation of a piston 41, the lock-up clutch 50 is capable of engaging, via the damping mechanism 60, the front cover 10 to an input shaft (not illustrated) of the automatic transmission.

The damping mechanism 60 is a mechanical element which is capable of absorbing a rotational speed difference between the pump impeller 20 and the turbine runner 30, a rotational speed difference which is generated at a time that the pump impeller 20 is directly connected to the turbine runner 30 via the lock-up clutch 50. The damping mechanism 60 is positioned within a space defined between the turbine runner 30 and the lock-up clutch 50. The damping mechanism 60 is securely connected to components of the lock up clutch 50 by means of rivets 52, and is securely connected to the turbine hub 34 by means of the rivets 53. The damping mechanism 60 is capable of absorbing the rotational speed difference (shock) by use of springs 61.

Next, described below is a structure of the pump blades 21 of the torque converter 1 according to the embodiment of the present invention.

Although the pump impeller 20 is provided with the plural pump blades 21, the following explanation will be given for one of the plural pump blades 21, and this explanation should be considered to be applied to the rest of the pump blades 21.

Figure 2:
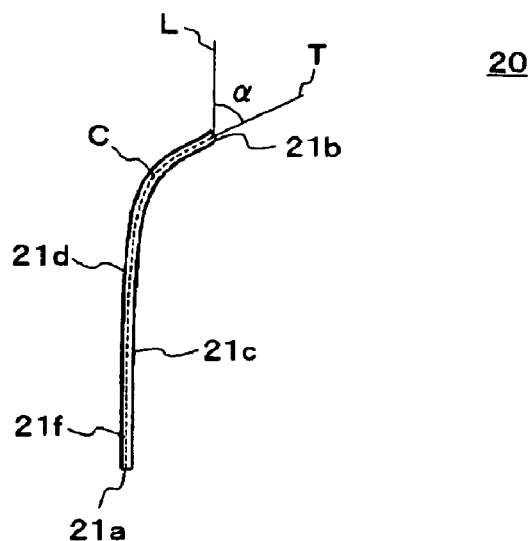
FIG. 2 is a cross sectional view schematically illustrating a structure of a pump blade of the torque converter, as seen from an inner core contact portion.

As illustrated in FIGS. 1 and 2, the pump blade 21 includes a fluid entrance portion 21a, a fluid exit portion 21b, a pressure surface 21c, and a suction surface 21d, an outer shell contact portion 21e, and an inner core contact portion 21f. The fluid entrance portion 21a is an inlet through which a working fluid flows from the stator wheel 40 to the pump impeller 20. The fluid exit portion 21b is an outlet through which a working fluid flows from the stator wheel 40 to the turbine runner 30. The pressure surface 21c is formed between the fluid entrance portion 21a and the fluid exit portion 21b, and is employed to pressurize the working fluid which has been supplied to the pump impeller 20 and is to be fed to the turbine runner 30. The suction surface 21d is also formed between the fluid entrance portion 21a and the fluid exit portion 21b, and is employed to apply a suction force being effective to circulate the working fluid from the pump impeller 20 to the turbine runner 30. The suction surface 21d corresponds to an opposite surface to the pressure surface 21c. The outer shell contact portion 21e is a boundary portion which is in contact with the outer shell 22. The inner core contact portion 21f is a boundary portion which is in contact with the inner core 23.

An exit angle of the pump blade 21 at the exit is designed to be at least greater than −90 degrees up to −68 degrees at the most, beginning from a first point at which the pump blade 21 is in contact with the outer shell 22, to a second point, at which the pump blade 21 is in contact with the inner core 23. It is preferable that the exit angle of the pump blade 21 is designed at least −80 degrees up to −75 degrees at the most. Here, the exit angle of the pump blade 21 is denoted with an angle $\alpha$ in FIG. 2, an angle $\alpha$ which is determined in combination with a tangent line (a tangent plane) T at the fluid exit portion 21b and a straight line (surface) L. The tangent line T is defined for a camber line (surface) C, which plots centers between the pressure surface 21c and the suction surface 21b, beginning from the fluid entrance portion 21a to the fluid exit portion 21b. The straight line L is crossed at a right angle with a rotational axis of the torque converter 1. This optimal angle $\alpha$ of the blade angle is expressed with a minus sign (−) which represents the pump blade 21 being inclined to the same direction as a crankshaft rotational direction.

Figure 3:
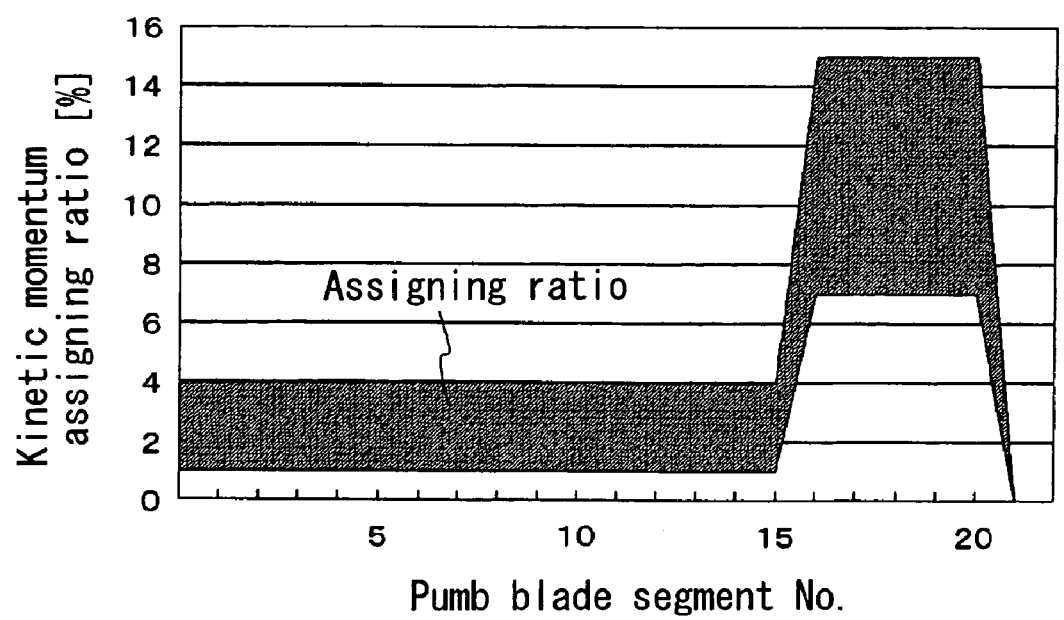
FIG. 3 is a diagram explaining a relationship between each segment of the pump blade and a level of kinetic momentum assigned to each segment.
Figure 4:
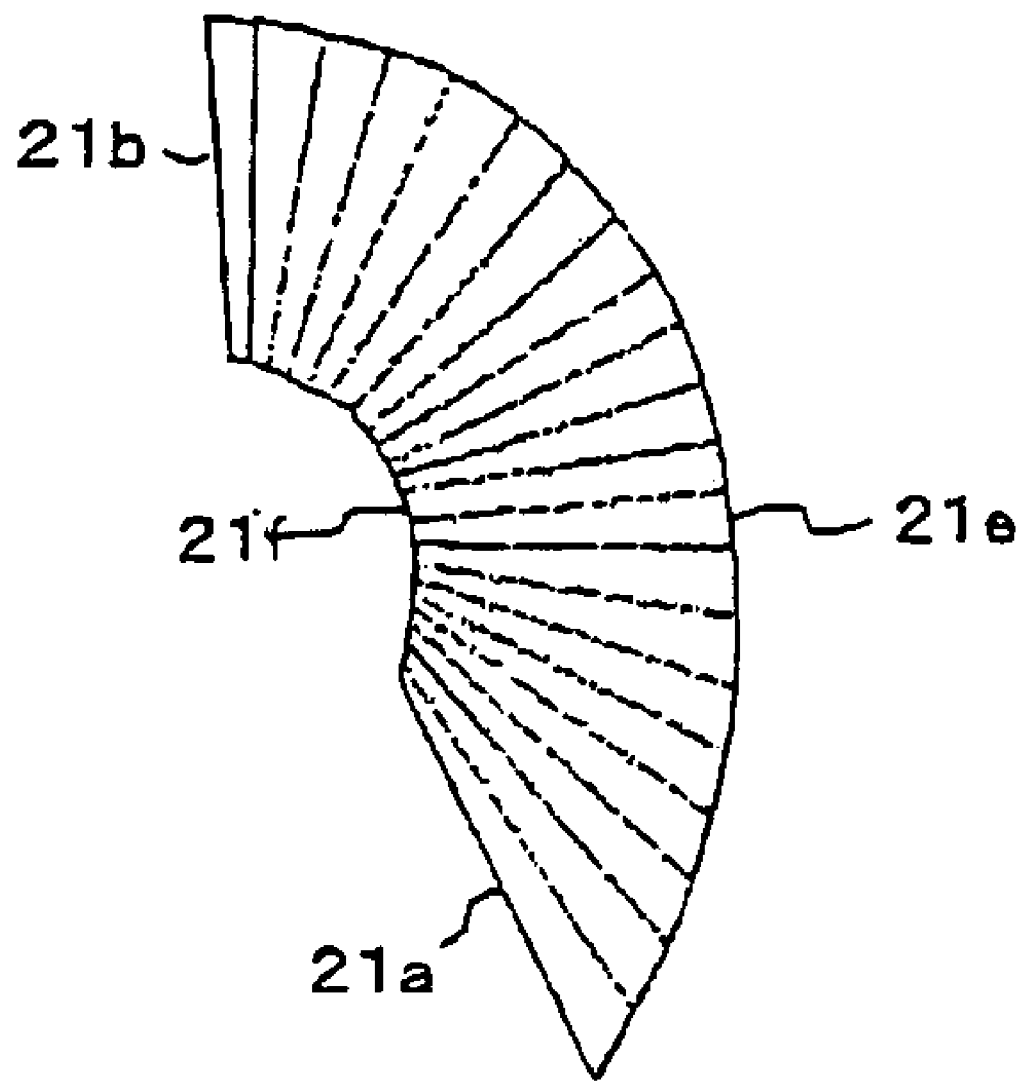
FIG. 4 explains the method of dividing the pump blade into twenty-one segments according to the embodiment of the present invention.

The structure of the pump blade 21 is determined as described below. According to the embodiment of the present invention, the pump blade 21 is equally divided into twenty-one segments from the fluid entrance portion 21a to the fluid exit portion 21b. These twenty-one segments are numbered from No.1 to No. 21, beginning from the side of the fluid entrance portion 21a. More specifically, the outer shell contact portion 21e is equally divided into twenty points extending from the fluid entrance portion 21a to the fluid exit portion 21b, and the inner core contact portion 21f is also equally divided into twenty points extending from the fluid entrance portion 21a to the fluid exit portion 21b. Therefore, the pump blade 21 is equally divided into twenty-one segments by straight lines (flat surfaces) connecting the twenty points of the outer shell contact portion 21e and the 21 points of the inner core contact portion 21f. As is explained in FIG. 3, the segments No. 1 to No. 16 respectively give some kinetic momentum at least 1% up to 4% at the most out of an entire amount of kinetic momentum of the fluid generated by the pump impeller 20, and the segments No. 17 to No. 21 are respectively assigned on an average at least 7% up to 15% at the most out of the entire amount of kinetic momentum of the fluid generated by the pump impeller 20.

Figure 5:
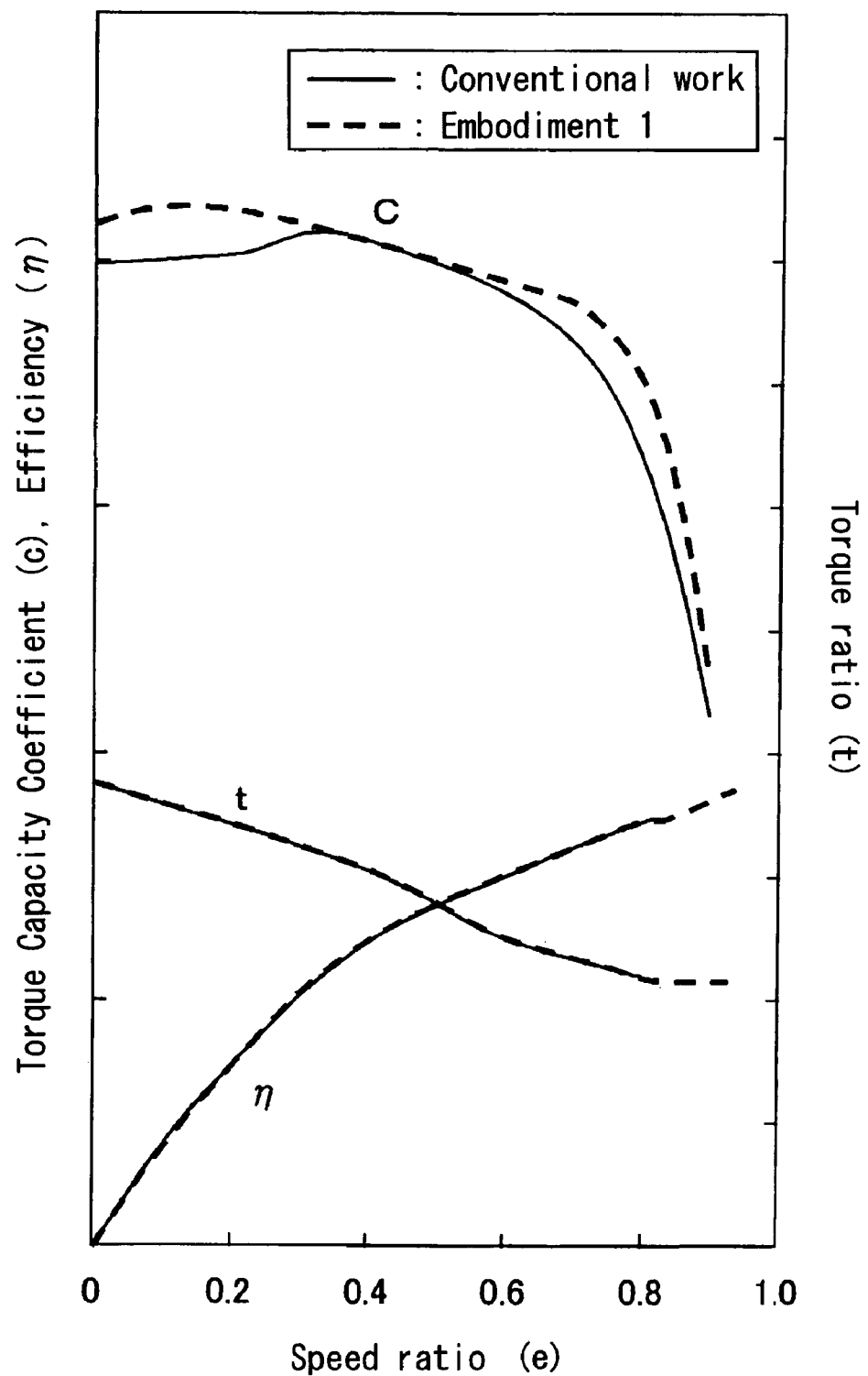
FIG. 5 is a diagram for explaining characteristics of the torque converter versus a speed ratio.

Next, described below is characteristics of the torque converter 1 according to the embodiment of the present invention with reference to FIG. 5, in which characteristics of the torque converter 1 is compared with characteristics of a conventional torque converter. In FIG. 5, a solid line denotes characteristics of the conventional torque converter in which an exit angle of a pump blade is 50 degrees, while a broken line denotes characteristics of the torque converter 1 according to the embodiment of the present invention. FIG. 5 explains characteristics of the torque converter 1, in terms of the torque capacity coefficient C, efficiency $\eta$, and torque ratio t, versus the speed ratio e.

Over an entire range of the speed ratio e, there is not much difference between the conventional torque converter and the torque converter 1 of the embodiment of the present invention, in terms of the torque ratio t and the efficiency $\eta$. However, the torque capacity coefficient C of the torque converter 1 of the embodiment of the present invention is superior, over almost an entire speed ratio range, to the torque capacity coefficient C of the conventional torque converter. Moreover, within a middle speed ratio range (e=0.3 to 0.7), the torque capacity coefficient C of the torque converter 1 can be restrained to an adequate level, as is illustrated in FIG. 5. Still moreover, the torque capacity coefficient C of the torque converter 1 within a low speed ratio range (e=0 to 0.3) is higher than the torque capacity coefficient C of the torque converter 1 within the middle speed ratio range.

The present invention is not limited to the above-described embodiment, and can be applied to any type of torque converters that do not deviate from the subject matter described above.

As described above, according to the embodiment of the present invention, by reducing the exit angle of the pump blade 21, it is possible to increase variations in kinetic momentum of a fluid at the pump exit portion 21b. Therefore, a torque capacity coefficient of the torque converter 1 can be enhanced on the whole, and the torque converter 1 can be downsized.

Further, according to the embodiment of the present invention, while maintaining the torque ratio and the efficiency at adequate levels, the torque capacity coefficient versus the speed ratio can be increased on the whole. However, a fluid velocity of a working fluid, which occurs within a middle speed ratio range, reaches a limit value relative to an energy applied to the toque converter 1. Therefore, it is possible to restrain an increase in the torque capacity coefficient within the middle speed ratio. Further, it is possible to avoid an occurrence of reduction of an engine rotational speed within a low speed ratio range, i.e., when a vehicle starts or is accelerated. Therefore, an accelerating feeling can be enhanced, and further, within a high speed ratio range (e=0.7 to 1.0), it is possible to enhance an accelerating performance to pass a vehicle ahead, a vehicle driving power such as quietness during a vehicle normal driving, and a fuel efficient.

The above-description according to the embodiment of the present invention does not influence on a stall torque ratio and the maximum efficiency, which are other important characteristics of a torque converter.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A torque converter comprising:
    an impeller having an outer shell, an inner core, and at least one pump blade provided between the outer shell and the inner core;
    a turbine having at least one turbine blade; and
    a stator capable of establishing a fluid circulation between the impeller and the turbine,
    wherein an exit angle of the at least one pump blade is greater than −90 degrees but less than −68 degrees, beginning from a first point, at which the at least one pump blade is in contact with the outer shell, to a second point, at which the at least one pump blade is in contact with the inner core.

2. A torque converter according to claim 1, wherein the at least one pump blade is divided into twenty one segments, beginning from a fluid entrance portion, at which a fluid flows into the impeller, up to a fluid exit portion, at which the fluid exits to the turbine, the twenty one segments are numbered from No. 1 to No. 21 being sequential from the fluid entrance portion, wherein the segments No.1 to No. 16 are respectively shaped in such a manner that the segments No.1 to No. 16 respectively give some kinetic momentum to the fluid at least 1% up to 4% out of an entire amount of kinetic momentum of the fluid generated by the impeller, and the segments No. 17 to No. 21 are respectively shaped in such a manner that the segments No. 17 to No. 21 respectively give some kinetic momentum to the fluid at least 7% up to 15% out of the entire amount of kinetic momentum of the fluid generated by the impeller.

3. A torque converter according to claim 2, further comprising:
    a lock-up clutch capable of connecting the impeller and the turbine so as to establish a driving forth transmitting path.

4. A torque converter according to claim 1, wherein the exit angle of the at least one pump blade is at least −80 degrees up to −75 degrees at the most, beginning from the first point to the second point.

5. A torque converter according to claim 4, further comprising:
    a lock-up clutch capable of connecting the impeller and the turbine so as to establish a driving forth transmitting path.

6. A torque converter according to claim 1, further comprising:
    a lock-up clutch capable of connecting the impeller and the turbine so as to establish a driving forth transmitting path.

* * * * *